June 12, 1956     T. D. WILLIAMSON, JR     2,749,944
PIPE LINE SPACER AND INSULATOR
Filed Jan. 2, 1953
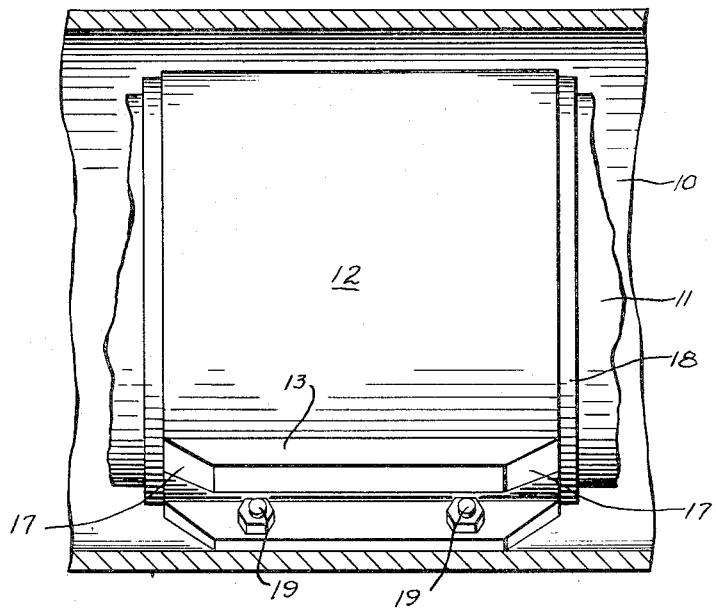
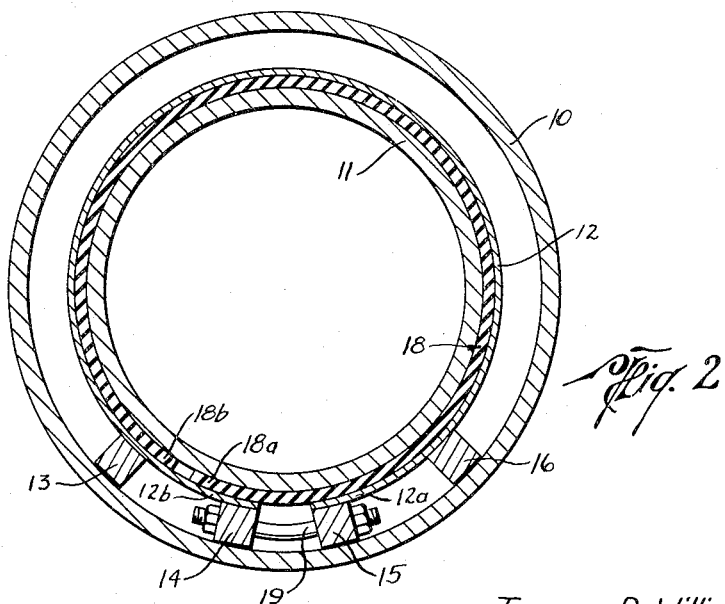
Truman D. Williamson Jr.
INVENTOR.
BY
ATTORNEYS

United States Patent Office 2,749,944
Patented June 12, 1956

2,749,944

PIPE LINE SPACER AND INSULATOR

Truman D. Williamson, Jr., Tulsa, Okla.

Application January 2, 1953, Serial No. 329,409

3 Claims. (Cl. 138—65)

This invention relates to an improved insulator apparatus for supporting a pipe line within a conduit, such as a crossing casing, and facilitating skidding the pipe line into the conduit. In one of its aspects, the invention relates to such an apparatus providing a strong insulated sheath around the pipe line on which spacer elements are mounted so that increased protection to the pipe line is afforded.

In the pipe line industry, it is common practice to protect a pipe line from corrosion by coating it with a special enamel or "dope" and then bonding a wrapping to the enamel while the same is hot. The pipe line enamel ordinarily is relatively brittle when cooled to atmospheric temperature and the wrapping tends to protect it and prevent its rupture as the pipe line is being made. Further, such a coated pipe line is ordinarily passed through an outer crossing conduit or casing at points where the pipe line passes under a highway, railroad, and the like. This is usually accomplished by first installing the crossing casing and then skidding the pipe line therethrough.

As the coated pipe line is skidded through the crossing casing, it is readily apparent that much damage could be done to the coating if some means were not provided for preventing the same. It has been suggested in the past that the pipe line be supported concentrically with the casing by a plurality of elongate sled-like runners or spacers evenly spaced around the periphery of and parallel to the pipe line and tightly secured thereto by cables passing transversely through each runner to encircle the pipe line. These runners are constructed of hard rubber or other insulating material in order to electrically insulate the pipe line from the crossing casing. Such insulation is highly desirable, if not necessary in this apparatus, because the runners sometimes dig into the pipe line coating to form a direct contact between the runners and the pipe line. Should the runners in such instances be made of steel, there would then be a short circuit between the pipe line and crossing casing which would result in corrosion of the pipe line.

In such prior apparatus, it is desirable to maintain the clamping cables out of contact with the pipe line coating to prevent damaging the same with consequent increased likelihood of corrosion. In order to do this, it is necessary that the runners be spaced sufficiently close together around the entire periphery of the pipe line and that they be of sufficient height so that the portion of the cable between the runners is suspended clear of the pipe line. Obviously, this requires a crossing casing considerably larger, often several pipe sizes larger, than the pipe line so that the latter, with the insulator thereon, can be skidded into the casing. Of course, a large number of runners of moderate height can be employed in such prior art apparatus in an effort to reduce the size of the casing but the minimum height of the runners is dictated largely by the fact that they must have a sufficiently large section that they can bear the weight of the pipe line, and the solid insulating materials available today for constructing the runners have a relatively low resistance to crushing and shearing. Use of a small number of runners of correspondingly greater height will obviously still further increase the size of the casing required. With such prior art apparatus, it is evident that the disadvantage of having to provide a crossing conduit of relatively large size as compared to that of the pipe line will always exist to some degree.

A further disadvantage of the prior art type of spacer and insulating apparatus described above is that it requires a considerable degree of care in its installation to insure that the runners are each solidly placed against the pipe line coating before, during and after tightening of the cables. If such care is not exercised, the runners tend to cock to one side thereby digging their corners or edges into the coating. Also, as the pipe line is skidded into the crossing conduit, the weight of the pipe line tends to cause the lower runners to drag backwards on the pipe line, and this further increases the possibility of the runners digging into and destroying the coating.

In accordance with this invention, such runners or spacers are carried on the outside face of a flexible metal band adapted to be placed around the pipe line whereby the effective bearing area of the spacers on the pipe line is greatly increased. A flexible electrically insulating material is disposed on the inside face of the metal band so as to insulate it from the pipe line and to provide a cushion between the band and the pipe line coating. Suitable means are provided for tightening the metal band around the pipe line and, since the metal band is insulated from the pipe line, it does not matter whether or not such means are maintained out of contact with the metal band as is it necessary to maintain the cables out of contact with the pipe line in the prior art apparatus discussed above. As a result, any desired number and any desired spacing of runners can be employed. Also, the spacers or runners can be constructed of metal, such as steel, thereby permitting a very strong construction even when the runners are of very small height. Such arrangement permits the spacers or runners to be situated only along the underneath portion of the pipe line, leaving the top portion free to closely approach the internal periphery of the crossing casing so that the latter can be only one pipe size larger than the pipe line.

In accordance with the invention, it is an object to provide apparatus for electrically insulating between a pipe line and an outer conduit, such apparatus finding particular advantage in pipe line crossings where the outer casing conduit is only one pipe size larger than the pipe line.

Another object is to provide such an apparatus in which spacers or runners serving to support and space a pipe line from the casing are mounted on the outside face of a band which is adapted to be disposed around the pipe line, whereby the stress imposed on the pipe line by the spacers in supporting the weight of such pipe line is distributed over a relatively large area by the band to substantially reduce the likelihood of rupturing any coating on the pipe line, the band being electrically isolated from the pipe line by an electrically material attached thereto.

Another object is to provide a spacer and insulating apparatus for pipe line crossings wherein spacers to be mounted on the pipe line to space it from the outer crossing conduit and to facilitate skidding the pipe line into the crossing conduit are carried on a band of flexible metal to not only increase the ease of installation of the spacers in a proper arrangement about the pipe line, but also to prevent the spacers from digging into and causing imperfections in a coating on the pipe line, such band having a flexible insulating material on its inner face.

Another object is to provide such a pipe line apparatus wherein the spacers are arranged along the band so as to be disposed along only the lower portion of the pipe line's circumference, whereby the pipe line can be situated in a crossing conduit even though the latter is only slightly larger than the pipe line or is out-of-round or the like.

Another object is to provide a pipe line crossing insulating and spacing apparatus wherein the spacers can be made of metal so as to be relatively small height and are carried on a metal band having a flexible electrically insulating material on its inner face, thereby not only providing a unitary structure easily installed on a pipe line, but also one which provides a relatively large bearing area between the pipe line and the spacers and one in which there is a substantial lessening of the tendency of the spacers to move and become misaligned relative to the pipe line as the same is skidded into the crossing conduit and one in which the spacers are always properly spaced apart along the periphery of the pipe line despite the lack of skill with which the apparatus is installed.

Other objects, advantages and features of this invention will be apparent to one skilled in the art upon a consideration of the written specification, the appended claims and the attached drawings, wherein:

Fig. 1 is a side view of a preferred embodiment of the apparatus of this invention which is shown installed on a pipe line within a crossing casing; and Fig. 2 is an end view of the apparatus in such installation taken on the line 2—2 of Fig. 1.

Like characters of reference are used throughout both views to designate like parts.

In the drawings, a portion of an outer conduit or crossing casing 10 is shown with the apparatus of this invention disposed therein around an inner conduit such as pipe line 11. It will be understood that casing 10 in use is normally buried under a railroad track, a highway or the like with its ends exposed so that pipe line 11 can be skidded thereinto. Pipe line 11 can be and ordinarily is covered with conventional coating comprising enamel and a wrapping.

In accordance with this invention, there is provided a flexible metal band 12 of substantial width and of sufficient length that it can substantially extend around pipe line 11 as shown. A plurality of elongate spacers 13, 14, 15 and 16 are disposed transversely across band 12 so that they extend parallel to pipe line 11. These spacers are preferably made of metal, such as steel, and have each of their ends bevelled as at 17 to facilitate skidding pipe line 11 through crossing casing 10 as the crossing installation is made. Spacers 13, 14, 15 and 16 are connected to the outer face of band 12 in any suitable manner as by welding, by bolts inserted from the inside face of band 11 to be screwed into the spacers or the like. When the spacers are fashioned from a relatively strong metal, such as steel, they can be made of a relatively smaller height than when constructed of hard rubber so that the spacing necessary between pipe line 11 and casing 10 can likewise be made smaller. Further, in a preferred embodiment, the spacers are spaced apart along a minor portion (less than 180 degrees) of metal band 12 while the remaining major portion (more than 180 degrees) of the band is free from spacers. This permits the upper circumferential portion of the pipe line to be in very close proximity with the upper circumferential portion of the crossing casing. This arrangement is particularly advantageous where the pipe line and the crossing casing differ by only one pipe size, e. g. when pipe line 11 is constructed of 4 inch pipe and the crossing casing from 6 inch pipe. Another distinct advantage of this arrangement derives from the fact that pipe line 11 and particularly conduit 10 oftentimes are out-of-round so that the clearance between the two at the out-of-round portions is less than if they both were in round. The minimum clearance required for the apparatus of this invention readily permits installation of pipe line crossings even under many conditions where such out-of-roundness is extreme.

A flexible electrically insulating material is disposed, preferably as a band 18, on the inside face of metal band 12 so that when the latter is positioned around the pipe line, it will be electrically isolated therefrom. As a result, even when the spacers are made from the preferred steel and even though casing 11 was to touch band 12, the pipe line is still electrically insulated from casing 11. Band 18 has still another function in that it can be made of a relatively soft material, such as sheet rubber, fiber glass, and the like, so as to form a cushion between metal band 12 and the coating on the pipe line, thereby substantially lessening the likelihood of the metal band rupturing or cracking such coating. To this end and to insure complete insulation of band 12 from the pipe line, the electrically insulating material can be extended slightly beyond the edges of the metal band as shown in Fig. 1. The insulating material is fastened to band 12 by any suitable means, such as bonding, cementing, etc., so that it can simultaneously and properly be placed around the pipe line with metal band 12, thereby eliminating the necessity of (1) separately placing it in position, then (2) positioning band 12 while holding the insulating material in place, and finally (3) aligning the metal band and insulating material to assure against short circuits. The insulating material should be sufficiently flexible that it can be flexed with metal band 12 to pass around the pipe line easily.

It will be noted that in the preferred embodiment of the apparatus shown in the drawings one end 18a of the insulating material extends beyond one end 12a of metal band 12 while the other end 12b of band 12 extends beyond the other end 18b of the insulating material. This permits a continuous portion of the insulating material to underlie both ends of band 12 to further assure maximum efficiency in electrical insulation between the metal band and the pipe line. While the ends of the insulating material can overlap, it is preferred that they do not to eliminate humps under the metal band.

Means are provided for tightly clamping the metal band, insulating material and spacers about the pipe line. Such clamping means are preferably provided by variable length connectors, such as threaded studs and nuts 19, between spacers 14 and 15 which are the two spacers respectively adjacent the ends of the metal band. With this construction, the apparatus can be very easily and quickly installed on a pipe line, it merely being necessary to align the ends of the metal band sufficiently that the studs can be passed through corresponding openings in spacers 14 and 15.

In using the embodiment of the apparatus of this invention shown in the drawings, the metal band, with the spacers and insulating material attached, is placed around the pipe line and the connecting studs inserted and the nuts tightened. The pipe line can then readily be skidded into the crossing casing since the spacers facilitate this operation. Of course, the band is mounted so that the spacers which are to support the pipe line are disposed along its lower portion.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An electrically insulating apparatus for supporting a pipeline spaced from the inside of an outer conduit and facilitating skidding the pipeline into the conduit which comprises, in combination, a discontinuous detachable band of a length adapted to extend substantially around the circumference of said pipeline with opposite ends of said band adjacent one another and the band having inside and outside faces, flexible electrically insulating material disposed on the inside face of said band to electrically insulate the band from the pipeline on which it is to be disposed, a plurality of separate and individual elongate spacers having one of their sides attached to the outside face of said band, said spacers being disposed parallel to each other and in circumferentially spaced relation about the pipeline on which the apparatus is to be assembled, said band being of a width at least substantially equal to the length of said spacers and providing a bearing support for the spacers between the spacers and the pipeline to distribute the bearing load of the spacers over a larger area than that of said sides, and means for tightly clamping said band and spacers about the pipeline.

2. The apparatus of claim 1 wherein said spacers are constructed of metal.

3. The apparatus of claim 1 wherein said spacers are spaced laterally from each other along a minor portion of the length of said metal band with the remaining major portion of the band being free from said spacers.

References Cited in the file of this patent

UNITED STATES PATENTS

| | | |
|---|---|---|
| 1,122,130 | Lamson | Dec. 22, 1914 |
| 2,551,867 | Bond | May 8, 1951 |